(Model.) 2 Sheets—Sheet 1.
J. W. WEBSTER.
CORD HOLDING MECHANISM FOR GRAIN BINDERS.
No. 301,190. Patented July 1, 1884.

Witnesses.
John F. Steward
John B. Kaspari

Inventor:
John W. Webster (Model.)

2 Sheets—Sheet 2.

J. W. WEBSTER.
CORD HOLDING MECHANISM FOR GRAIN BINDERS.

No. 301,190.

Patented July 1, 1884.

Witnesses:
John F. Steward
John B. Kaspari

Inventor:
John W. Webster

United States Patent Office.

JOHN W. WEBSTER, OF CHICAGO, ILLINOIS, ASSIGNOR TO WILLIAM DEERING, OF SAME PLACE.

CORD-HOLDING MECHANISM FOR GRAIN-BINDERS.

SPECIFICATION forming part of Letters Patent No. 301,190, dated July 1, 1884.

Application filed May 12, 1883. (Model.)

*To all whom it may concern:*

Be it known that I, JOHN W. WEBSTER, of Chicago, in the county of Cook and State of Illinois, have invented certain new and useful Improvements in Cord-Holding Mechanism for Grain-Binders, of which the following is a full specification, reference being had to the accompanying drawings.

The object of my invention is to improve the device described and claimed in my Patent No. 278,639, May 29, 1883, and to conform the working parts to the particular style of knotting apparatus to which I have seen fit to adapt them, and to overcome certain objections that may be urged to the arrangements there shown. By devising a new arrangement of the parts constituting the subject-matter of my former patent, and conforming the associated mechanism thereto, I am enabled to get the worm-shaft wholly out of the path of the needle and of the twine.

The nature of the invention consists, principally, in mounting the holding-disk upon one end of its shaft and a pinion on the other end, whereby the worm-shaft is removed to an out-of-the-way position, and in conforming the parts thereto, as will be described and claimed.

In the form of construction shown in Sheet 1 of the former patent referred to the worm-shaft is slightly in the way of the twine, and it tends to interfere with the needle in its effort to lay the twine deeply into the notches of the holding-disk. For this reason I have removed the shaft from that position. In the modification shown in Sheet 2 of said patent the worm-shaft is removed from the position referred to; but this places the worm-shaft diagonal in relation to its driving-gear, so that the said gear and the worm-shaft pinion are required to be much beveled and askew. In both forms shown in the former patent the worm works from necessity on a beveled worm-wheel. By placing the holding-disk on a shaft that revolves in bearings in the knotter-frame and making the worm-wheel on the end of the shaft outside the bearing, I may make it with straight teeth and place the knotter-shaft and worm-shaft on the same vertical plane, the worm-shaft just behind the knotter-shaft, and thus at the same time remove it from its position of obstruction to the twine.

Figure 1:
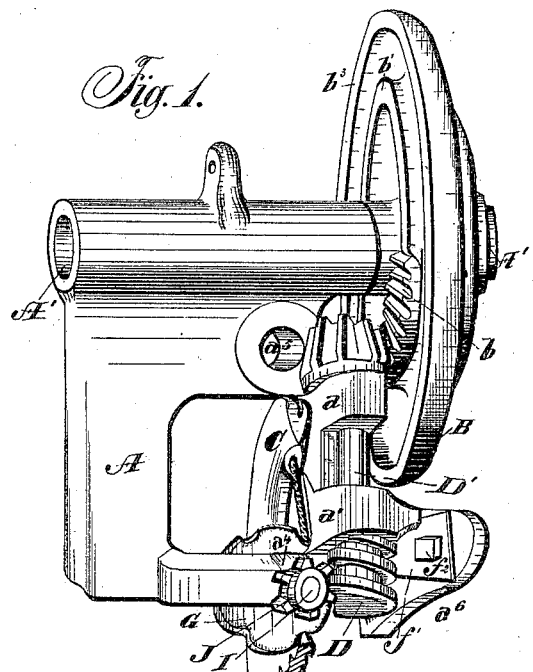
Figure 2:
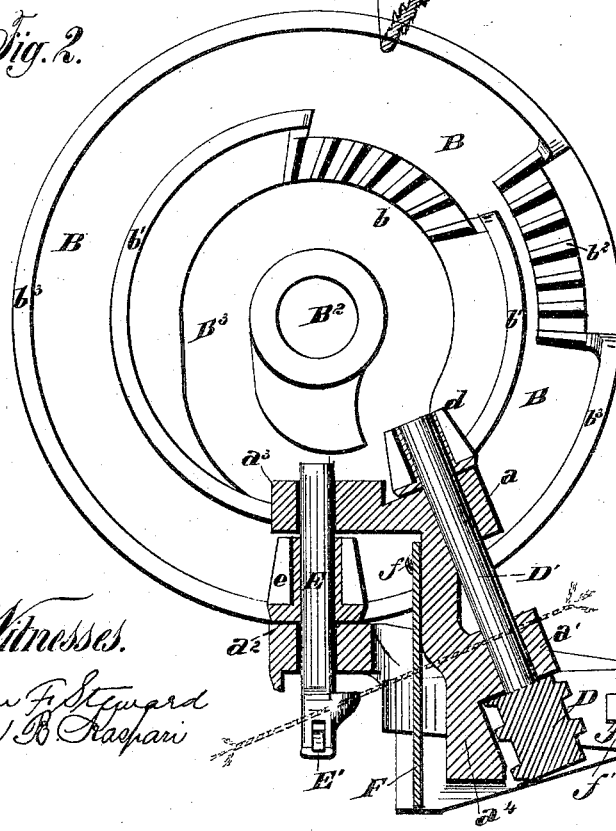
Figure 3:
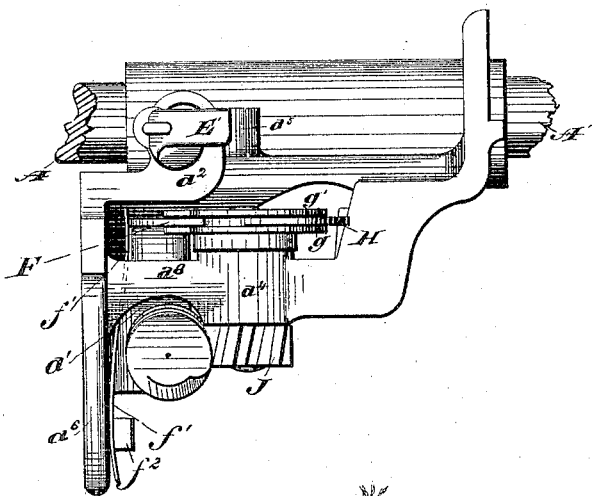
Figure 4:
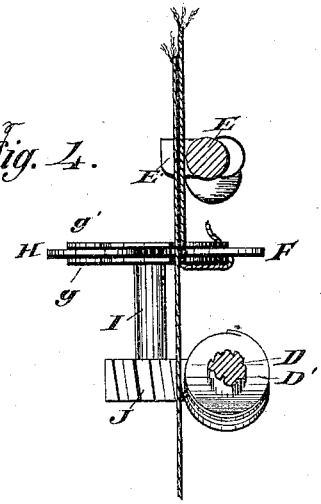
Figure 5:
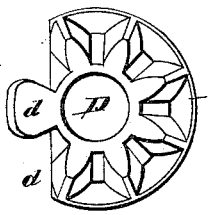
Figure 6:
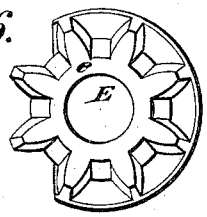

Figure 1 is a perspective view of the knotter and holder frame as viewed from the under or outer side of the frame at a point a little to the left of that to which the point of the needle is directed, showing the holder, its pinion and shaft, the worm and its shaft and bearings and driving-pinion, the holder-actuating gear-segment, and the point of the needle. Fig. 2 is a side view of the driving-gear, the knotter-frame being sectioned on the axis of the worm-shaft and knotter-shaft. Fig. 3 is a view of the frame as seen from a point facing the working end of the knotter-shaft. Fig. 4 is a view of the knotter, holding-disk, worm, and knotter-shaft pinion, and the twine in position for being acted upon, with all the frame-work removed, as if seen in a reverse direction from the view in Fig. 3. Figs. 5 and 6 are views of knotter and holder driving pinions as seen from their axes, facing their smaller ends.

A is the knotter-frame, having a sleeve in which is journaled the gear-shaft A'. In this one casting are all the bearings for the various working parts.

$a$ and $a'$ are the bearings for the worm-shaft D'.

$a^2$ and $a^3$ are the bearings for the knotter-shaft, between which is the knotter-pinion $e$.

$a^4$ is a cross-bar, in which is formed the bearing for the holder-shaft.

$a^5$ is an eye in the frame, in which the stem of the knife-arm (not shown) vibrates.

$a^6$ is a projection forming a support for the holder-spring.

$a^8$ designates a part of the cross-bar $a^4$ of the frame.

B is the usual cam and gear-wheel for giving motion to all of the moving parts of the knotting mechanism.

$b$ is a segment for driving the holding mechanism, and $b'$ a delay-rim for locking the same in its position of rest.

$b^2$ is a segment for giving motion to the knotter-pinion, and $b^3$ is a delay-rim for locking the same in its position of rest.

$B^2$ is the eye of wheel, and $B^3$ is a cam-groove for actuating the cord-knife. (Not shown.)

C is the point of the needle, (shown in its position for laying the twine into the notch of the holding-disk, its point being thrust through the hole in the frame A, and upon the opposite side of the knotter and holder driving shaft from the driving-wheel B.)

D is the worm, which I forge onto the end of the shaft D', which shaft revolves in the bearings $a$ and $a'$ in the same vertical plane with and just behind the knotter-shaft, as seen in Fig. 2.

$d$ is a bevel-pinion pinned or keyed to the shaft D'. This pinion and the worm D are at opposite ends of the shaft, and hence overhang the bearings $a$ and $a'$.

E is the knotter-shaft, journaled in the bearings $a^2$ and $a^3$, and having the common form of knotting-bill, E', and secured between the bearings is the pinion $e$.

F is the holder-plate, pivoted by the rivet $f$ to the frame in the recess beneath the knotter-shaft bearings. Its other end is free to move.

$f'$ is the holder-plate spring, its free end resting against the holder-plate and retained in place by the screw-bolt $f^2$.

G is the holding-disk, in this instance composed of two like circular notched disks, $g$ and $g'$, separated by a thin washer, the whole being riveted together.

H is a thin piece of steel lying loosely between the disks, and so shaped as to guide shreds of twine from between them.

I is the holder-shaft, provided with the slightly skew-toothed pinion J.

The worm D is left-hand threaded, in order to revolve the pinion J in the proper direction.

The holder-shaft I is of such length that it may be properly journaled in a single bearing, $a^4$, of the frame. This arrangement carries the pinion J so low that the worm-shaft becomes nearly radial to the axis of the wheel B.

In some cases the worm-shaft may be quite radial; but not being in this case, the teeth of the segment are slightly angled, so that they shall work properly with the teeth of the pinion $d$.

In Figs. 2 and 4 the position of the twine is seen, showing the worm-shaft and all of the new parts I have introduced to be in no way obstructive to the twine or needle.

What I claim is—

1. The knotter-driving gear B, having its segment $b^2$, the knotter-shaft having its pinion in proper relation thereto, the said wheel having also the segment $b$, the shaft D', located in the same vertical plane with and just behind the knotter-shaft, and having its pinion $d$ properly located in relation to the segment $b$, all combined and supported by suitable bearings, substantially as described.

2. In a knotting and holding mechanism, the knotter-frame having the bearings for the knotter-shaft and the holder-driving worm-shaft, and the recess for the holding-plate therebetween, substantially as shown and described.

3. The knotter-frame A, having the bearings for the knotter-shaft and the holder-driving worm-shaft, and the bearing $a^4$ for the shaft of the holding-disk, and the pinion J on the end of the shaft outside the bearing, by which construction the worm-shaft is so far removed from the knotter-shaft that they may be upon the same plane in relation to the movement of the needle and the driving-gear, for the purpose specified, substantially as described.

JOHN W. WEBSTER.

Witnesses:
J. F. STEWARD,
JOHN B. KASPARI.